(12) United States Patent
Smith

(10) Patent No.: US 9,033,311 B2
(45) Date of Patent: May 19, 2015

(54) VALVE FOR A FLUID FLOW CONNECTOR HAVING AN OVERMOLDED PLUNGER

(75) Inventor: Mark A. Smith, Plainfield, IL (US)

(73) Assignee: DS Smith Plastics Limited, London (GB)

( * ) Notice: Subject to any disclaimer, the term of this patent is extended or adjusted under 35 U.S.C. 154(b) by 25 days.

(21) Appl. No.: 13/347,523

(22) Filed: Jan. 10, 2012

(65) Prior Publication Data

US 2012/0223095 A1   Sep. 6, 2012

Related U.S. Application Data

(63) Continuation of application No. 11/312,884, filed on Dec. 20, 2005, now Pat. No. 8,091,864.

(51) Int. Cl.
| | |
|---|---|
| F16K 15/06 | (2006.01) |
| F16K 27/02 | (2006.01) |
| B29C 45/16 | (2006.01) |
| B29L 31/00 | (2006.01) |

(52) U.S. Cl.
CPC ......... F16K 27/0209 (2013.01); *B29C 45/1676* (2013.01); *B29L 2031/7506* (2013.01); F16K 15/063 (2013.01)

(58) Field of Classification Search
CPC .............. F16K 27/0209; F16K 15/063; B29C 45/1676; B29L 2031/7506
USPC ........................ 222/1; 251/148, 324, 332, 357
See application file for complete search history.

(56) References Cited

U.S. PATENT DOCUMENTS

| | | | |
|---|---|---|---|
| 2,904,060 A | 9/1959 | Fausek et al. | |
| 3,013,768 A | 12/1961 | La Mastra | |
| 3,319,537 A | 5/1967 | Pittman | |
| 3,326,520 A | 6/1967 | Guenther | |
| 3,379,214 A | 4/1968 | Weinberg | |
| 3,445,089 A | 5/1969 | Murray | |
| 3,861,646 A | 1/1975 | Douglas | |
| 4,096,754 A | 6/1978 | Beveridge, Jr. et al. | |
| 4,196,886 A | 4/1980 | Murray | |
| 4,214,507 A | 7/1980 | Hock et al. | |
| 4,286,636 A | 9/1981 | Creddle | |
| 4,331,266 A | 5/1982 | Bond | |
| 4,336,920 A | 6/1982 | Murray | |
| 4,353,488 A * | 10/1982 | Schneiter et al. | 222/501 |
| 4,380,310 A * | 4/1983 | Schneiter et al. | 222/501 |
| 4,421,146 A | 12/1983 | Bond et al. | |

(Continued)

FOREIGN PATENT DOCUMENTS

GB    2364560    1/2002

OTHER PUBLICATIONS

Communication from European Patent Office, Dec. 14, 2012.

(Continued)

*Primary Examiner* — John Bastianelli
*Assistant Examiner* — Andrew J Rost
(74) *Attorney, Agent, or Firm* — McAndrews, Held & Malloy, Ltd.

(57) ABSTRACT

A fluid flow connector and a method of manufacturing the same wherein the fluid flow connector utilizes a valve having a plunger which is made by overmolding a soft exterior to a hard core. The soft exterior being overmolded to the hard core by either insert or multi-shot methods. The method also including attaching the soft exterior to the hard core mechanically and/or by molecular bonding.

18 Claims, 4 Drawing Sheets

(56) References Cited

U.S. PATENT DOCUMENTS

| | | | |
|---|---|---|---|
| 4,525,910 A | 7/1985 | Bohemer | |
| 3,381,352 A | 5/1986 | Kidner et al. | |
| 4,601,410 A | 7/1986 | Bond | |
| 4,913,316 A * | 4/1990 | Richter | 222/1 |
| 4,979,721 A | 12/1990 | Gilbert | |
| 5,022,313 A | 6/1991 | Shonz et al. | |
| 5,158,479 A | 10/1992 | Mouissie | |
| 5,230,149 A | 7/1993 | Martin | |
| 5,282,412 A | 2/1994 | Ebbing | |
| 5,421,306 A | 6/1995 | Talaski | |
| 5,477,883 A | 12/1995 | Totten | |
| 5,529,738 A | 6/1996 | Mercereau | |
| 5,577,641 A | 11/1996 | Laforcade et al. | |
| 5,643,521 A | 7/1997 | Nehm | |
| 5,647,511 A | 7/1997 | Bond | |
| 5,749,493 A | 5/1998 | Boone et al. | |
| 5,795,337 A | 8/1998 | Grimard | |
| 5,878,798 A * | 3/1999 | Harris et al. | 141/346 |
| 5,901,761 A * | 5/1999 | Rutter et al. | 141/346 |
| 5,902,276 A | 5/1999 | Namey, Jr. | |
| 5,983,964 A * | 11/1999 | Zielinksi et al. | 141/346 |
| 6,070,763 A | 6/2000 | Gueret | |
| 6,077,245 A | 6/2000 | Heinrich et al. | |
| 6,196,552 B1 | 3/2001 | Peterson et al. | |
| 6,250,516 B1 | 6/2001 | Story et al. | |
| 6,284,181 B1 | 9/2001 | Gaster | |
| 6,347,785 B1 | 2/2002 | Copp et al. | |
| 6,490,964 B2 | 12/2002 | Buynacek | |
| 6,607,097 B2 | 8/2003 | Savage et al. | |
| 6,612,545 B1 * | 9/2003 | Rutter et al. | 251/149.6 |
| 6,629,624 B2 | 10/2003 | Stillinger et al. | |
| 6,631,823 B2 | 10/2003 | Stillinger et al. | |
| 6,637,725 B2 | 10/2003 | Davis et al. | |
| 6,702,337 B2 * | 3/2004 | Rutter et al. | 285/377 |
| 6,893,000 B2 | 5/2005 | Rutter et al. | |
| 6,926,178 B1 | 8/2005 | Anderson et al. | |
| 2003/0150498 A1 | 8/2003 | Williams | |
| 2004/0112562 A1 | 6/2004 | Khoury | |
| 2004/0210196 A1 | 10/2004 | Bush, Jr. et al. | |
| 2004/0245673 A1 | 12/2004 | Allsop | |
| 2005/0065472 A1 | 3/2005 | Cindrich et al. | |
| 2007/0219508 A1 | 9/2007 | Bisegna et al. | |

OTHER PUBLICATIONS

Response to the Extended European Search Report, Jun. 27, 2013.

\* cited by examiner

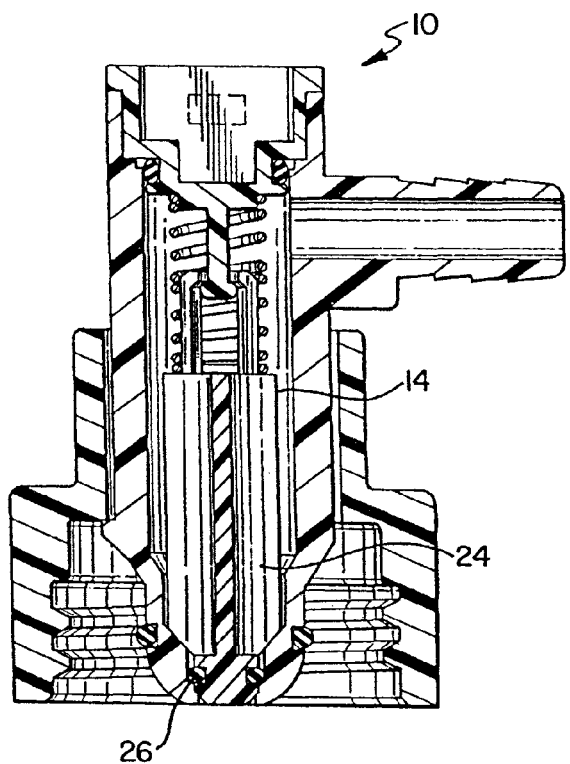
FIG. 3
PRIOR ART
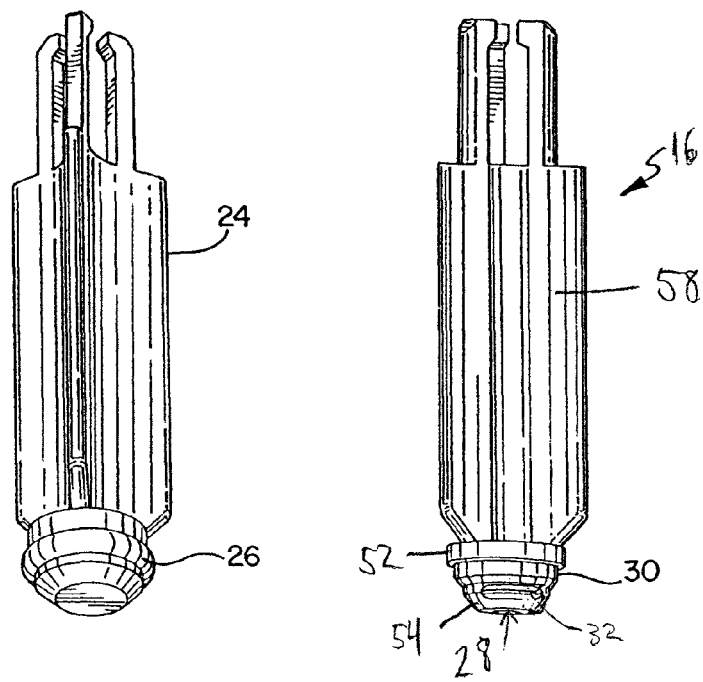
FIG. 4
PRIOR ART
FIG. 5

VALVE FOR A FLUID FLOW CONNECTOR HAVING AN OVERMOLDED PLUNGER

CROSS REFERENCE TO RELATED APPLICATION

The present application is a continuation of U.S. Ser. No. 11/312,884, filed Dec. 20, 2005, now U.S. Pat. No. 8,091,864 issued Jan. 10, 2012, the entire contents of which is incorporated herein by reference.

TECHNICAL FIELD

The invention relates generally to flexible packaging and more specifically to the fluid connectors used to connect the flexible packaging to their end uses.

BACKGROUND OF THE INVENTION

A number of flexible plastic containers are well known in the art for storing and dispensing wine, soft drink syrup, dairy products, enteral feeding solutions, fruit juices, tea and coffee concentrates, puddings, cheese sauces, cleaning chemicals and many other flowable materials. The flexible containers described above typically have walls fabricated from polymeric films having either a monolayer or multiple layer structure. The particular polymers constituting the container film layers will often vary depending upon the type of material to be placed in the container.

In some instances, the film layers may additionally include an oxygen barrier material layer to prevent contact between such materials and oxygen or other gas sensitive contents. In some applications, the walls of the containers may be metallized, or coated with a metallic layer such as aluminum to prevent incursion of oxygen or other gases. A separate metallized enclosure may also encase the polymeric container.

These flexible polymeric containers 1 generally have inlets and/or spouts 2 for filling and dispensing the contents (FIG. 8). The spout typically includes a flange which is sealed to an inside surface of one of the walls of the container. In most applications, the containers are then placed within a corrugated box. The spout extends through an opening provided in the box to dispense the contents. Such packaging systems are commonly referred to as "bag-in-box"or BIB. Bag-in-box systems have enjoyed wide success in a number of industries, most notably for use in containing and dispensing soft drink syrup and other liquid products. Prior art examples of such systems of such systems are shown in U.S. Pat. Nos. 4,286,636; 4,601,410; 5,647,511; 5,749,493; and 6,607,097, the entire disclosures of which are incorporated herein by reference.

The BIBs which are used to store and dispense soft drink syrup typically use fluid flow connectors to connect the containers to fountain dispensing machines. The fluid flow connectors generally have valves that remain closed until the connectors are attached to the spouts of the containers. Such valves include plungers that fit into the inlet of the fluid flow connector so as to regulate the flow of the soft drink syrup.

The plunger includes a member which is made of a hard plastic and an O-ring that is fitted to a distal end of the member. When the fluid flow connector is not attached to a BIB, the plunger is biased towards a closed position with the O-ring being pushed against the inlet of the fluid flow connector to provide a fluid tight seal. When the fluid flow connector is attached to a BIB, the spout of the BIB causes the plunger to be pushed away from the inlet thereby allowing fluid to flow through the inlet.

The O-rings which are used in BIB systems for dispensing soft drink syrup are made of ethylene propylene diene monomer or "EPDM". It has been discovered by the applicant that, when the fluid flow connectors described above are attached to BIBs containing syrup for diet soft drinks, the O-rings swell. This swelling causes the fluid connectors to leak because the O-rings can no longer provide a fluid tight seal when the connectors are not connected to the containers. The leaking fluid flow connectors also lets air into the fountain dispensing machines, causing a loss of vacuum or suction and, in some cases, an adverse effect on the taste of the dispensed soft drinks. The swelling of the O-rings additionally creates another problem; the swollen O-rings decrease the flow rate through the fluid flow connectors when the connectors are attached to the spouts of containers and fluid is being dispensed from the containers.

For example, one study performed by the applicant showed that the EPDM O-ring used with existing fluid flow connectors swelled to 0.05 inches in a matter of weeks when it was exposed to diet soft drink syrup at elevated temperatures. This same swelling occurs over a matter of months for EPDM O-rings exposed to diet soft drink syrup at ambient temperatures. As a result of the swelling of the O-rings and the subsequent leakage of syrup, a large number of service calls are made by the syrup suppliers to replace the fluid connectors, plungers and/or the O-rings.

The above-described problems generate increased operating costs for the soft drink syrup suppliers who have to make additional service calls to soda fountain retailers to repair leaking fluid flow connectors. Moreover, fountain soda retailers incur increased operating costs because of the clean-up of leaked syrup caused by the leaking fluid connectors. The retailers also lose sales of diet fountain soda while waiting for the leaking fluid flow connectors to be repaired or from the connectors not being able to dispense the syrup properly.

The present invention is designed to provide advantages over the presently used system described above. A full discussion of the features and advantages of the present invention is deferred to the following detailed description, which proceeds with reference to the accompanying drawings.

SUMMARY OF THE INVENTION

The present invention is directed to a fluid flow connector that is coupled with the spouts of fluid containers to overcome the problems associated with prior art fluid flow connectors. The present invention also includes a method of manufacturing the fluid flow connectors.

The present invention includes a fluid flow connector that utilize a valve having a plunger that has a soft exterior which is overmolded to a hard core. The soft exterior replaces the EPDM O-rings that are used in the prior art to provide fluid tight seals with the inlet of fluid flow connectors. The present invention, thus, does not have the above-described problems associated with the prior art fluid flow connectors.

One embodiment of the present invention includes a fluid flow connector having an adapter for attaching the fluid flow connector to a spout of a fluid container. The fluid flow connector also includes a valve that is actuated to allow flow through the connector when the connector is attached to the spout of the fluid container. The valve includes a plunger that has a hard core and a soft exterior that is overmolded to the hard core. The hard core of the plunger is made of a thermoplastic material and the soft exterior is made of a thermoplastic elastomer that will provide a fluid tight seal with the inlet of the fluid flow connector.

One of the advantages of the present invention is that because the plunger is formed by overmolding, EPDM O-rings do not have to be used in the valve to provide a fluid tight seal with the inlet of the fluid flow connector. The present invention can thus provide a fluid flow connector that does not utilize EPDM O-rings which have a tendency to swell when the fluid flow connectors are used in applications having diet soft drink syrup.

For example, in one study completed by the applicant, plungers were manufactured for fluid flow connectors consisting of soft exteriors made of Santoprene™ TPV 271-55 which were overmolded to hard cores made of polyoxymethylene copolymer. The results of the study showed that the soft exteriors of the plungers embodying the present invention had significantly less swelling than did the EPDM O-ring of prior art plungers when the fluid connectors were used in applications having diet soft drink syrup. The present invention can thus be utilized for a significantly longer period of time without encountering the problems which occur from connectors having swollen O-rings.

It should be appreciated that the present invention is not limited to the above-described materials. Depending on the applications, other suitable materials may be used to manufacture the present invention.

It should also be understood that the term "overmolding" encompasses both insert and multi-shot molding processes. The present invention incorporates both techniques. For example, in one embodiment of the present invention, the hard core of the plunger is molded first and then transferred to second mold where the soft exterior is shot around one of the distal ends of the hard core. This technique is referred to as insert molding.

In another embodiment of the present invention, a multi-shot molding technique is used. In this embodiment, a press with multiple barrels is used, allowing the materials used for both the soft exterior and the hard core to be shot into the same mold.

The present invention also includes different methods of attaching the soft exterior to the hard core to form the plunger. In one embodiment of the present invention, the hard core is first formed. Then, once the hard core is cured, the soft exterior is overmolded to the hard core. The second overmolding of the soft exterior to the hard core occurs within a reasonable time subsequent to the molding of the hard core, so that the soft exterior tends to molecularly bond to the underlying hard core and form a single unit.

In another embodiment of the present invention, the hard core of the plunger is formed with at least one opening or aperture at the distal end of the hard core where the soft exterior will be overmolded to. The soft exterior can then be overmolded to the core at any time after the hard core has been formed. The soft exterior of the plunger is injected so that the soft exterior forms around the apertures and may be mechanically attached to the hard core of the plunger.

It should be appreciated that the soft exterior of the plunger can be overmolded to the hard core so that it is both mechanically attached and molecularly bonded to the hard core.

Other features and advantages of the invention will be apparent from the following specification taken in conjunction with the drawings.

BRIEF DESCRIPTION OF THE DRAWINGS

To understand the present invention, it will now be described by way of example, with reference to the accompanying drawings in which:

FIG. 3 is a cross section side view of a prior art fluid flow connector;

FIG. 4 is a perspective view of a prior art plunger which includes an O-ring;

FIG. 5 is a perspective view of a hard core of a plunger of an embodiment of the present invention;

DETAILED DESCRIPTION

Figure 1:
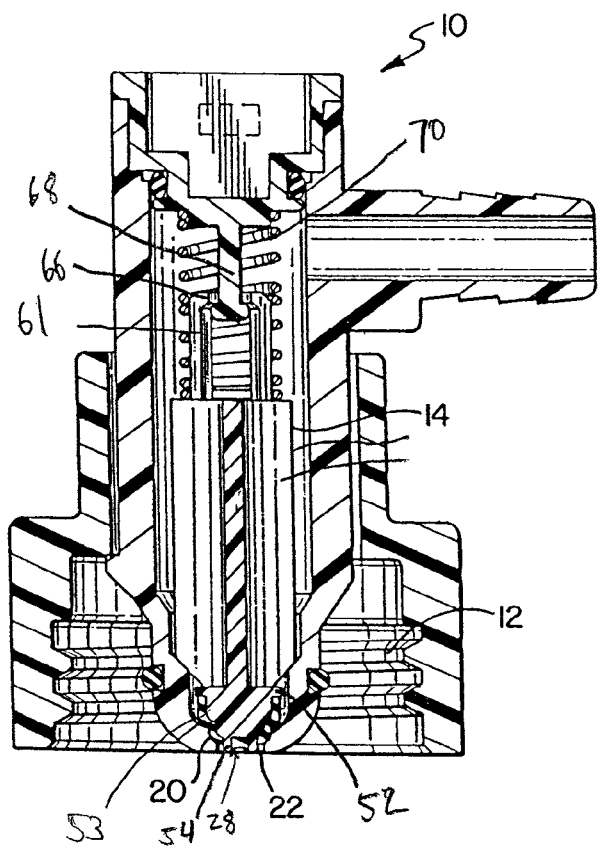
FIG. 1 is a cross section side view of an uncoupled fluid flow connector embodiment of the present invention.

While this invention includes embodiments in many different forms, the embodiments shown in the drawings and described herein are preferred embodiments. Those preferred embodiments are to be considered exemplifications of the principles of the invention and are not intended to limit the broad aspect of the invention to the embodiments illustrated and described herein.

Figure 2:
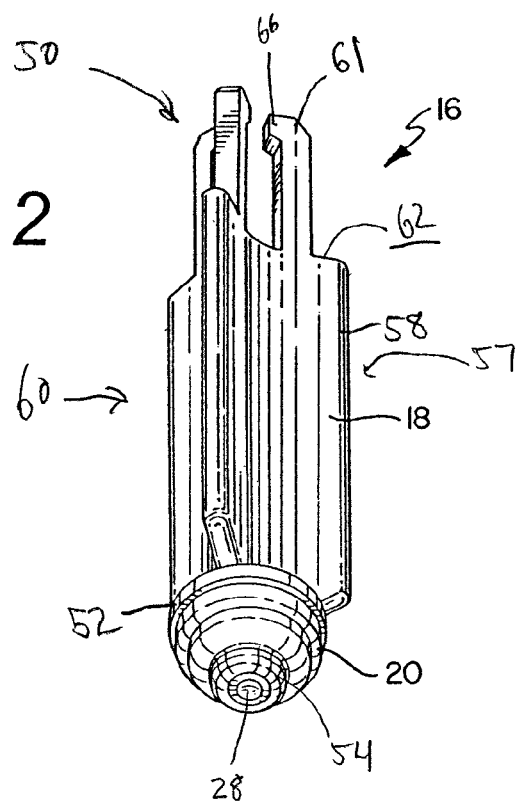
FIG. 2 is a perspective view of a plunger of an embodiment of the present invention.

The present invention is directed to a fluid flow connector 10 having an adapter 12 for attaching the fluid flow connector 10 to a spout of a fluid container. One embodiment of the present invention is illustrated in FIG. 1. The fluid flow connector 10 also includes a valve 14 that is actuated to allow flow through the connector 10 when the connector 10 is attached to the spout of the fluid container. The valve 14 includes a plunger 16 that has a hard core 18 and a soft exterior 20 that is overmolded to the hard core 18. One embodiment of plunger 16 is illustrated in FIG. 2. In that embodiment of the present invention, the hard core 18 of the plunger 16 is made of a thermoplastic material and the soft exterior 20 is made of a thermoplastic elastomer that will provide a fluid tight seal with the inlet 22 of the fluid flow connector 10. FIG. 1 illustrates the fluid flow connector 10 in the closed position with the soft exterior 20 of plunger 16 forming a fluid tight seal with inlet 22.

FIGS. 1 and 2 show plunger 16 having a proximal end 50 and a distal end 30. The hard core 18 of the plunger has a first annular flange 52 and a second annular flange 54 axially spaced from the first annular flange 52 to define an annular channel 53 therebetween. The soft exterior 20 is positioned within the annular channel 53. An aperture 28 is positioned at the distal end 30 of the plunger 16 and extends axially through a portion of the rod to a pair of radially extending annular openings 32 with outlets positioned within the annular channel 53 and circumferentially spaced from one another (See FIGS. 5-7). As will be discussed in greater detail below, the soft exterior material is injected into the aperture 28 where it flows through an interior of the hard core 18 and axially outwardly through the annular openings 32 and into the annular channel 53 to mechanically bond the soft exterior 20 to the hard core 18 to form the plunger assembly.

The hard core 18 has an elongate plunger rod 57 having three intersecting ribs 58 extending axially, upwardly from the first flange 52 in a direction opposite from the second flange 54 to define a generally three-pointed star shaped body 60 when viewed in horizontal cross-sectional dimension. A finger 61 extends from an upper surface 62 of each of the ribs 58. The fingers 61 extend axially, upwardly and terminate in an enlarged distal end 66 having a hook shape extending radially inwardly. As shown in FIG. 1, the fingers grasp a stem of a poppet 68 of the valve with the plunger shown biased into a closed position by spring 70.

Prior art fluid flow connectors 10, like the one illustrated in FIG. 3, have utilized valves 14 which have included plungers 24 having O-rings 26. The O-rings 26 in the prior art are fitted to the distal end of the plunger 24 as shown in FIG. 4 and are made using EPDM. The O-rings 26 allow the valves 14 to have a fluid tight seal when the connectors 10 are in the closed position. One of the problems with the prior art valves 14 is that when the fluid flow connectors 10 are used to dispense diet soft drink syrup, the O-rings 26 have a tendency to swell significantly. In such applications, the prior art O-rings 26 swell to a point where there is no longer a fluid tight seal and the connectors begin to leak or let air in when they are not connected to the containers. The swollen O-rings 26 also decrease the flow rate of the syrup through the connectors 10 when the connectors are dispensing fluid from the containers.

The present invention is directed to a fluid flow connector 10 which does not involve the use of O-rings 26 but instead utilizes overmolding to mold a soft exterior 20 to plunger 16 as shown in FIG. 2. The soft exterior 20 replaces the O-ring 26. Because it can be made of materials other than EPDM, the soft exterior 20 does not swell as significantly as the O-rings 26 when the connector 10 is used in diet soft drink application. Both the hard core 18 and the soft exterior 20 can be made of any suitable material depending on the applications in which the fluid flow connector 10 will be used. In one embodiment of the present invention, the hard core is made of a thermoplastic material while the soft exterior is made of a thermoplastic elastomer.

Figure 6:
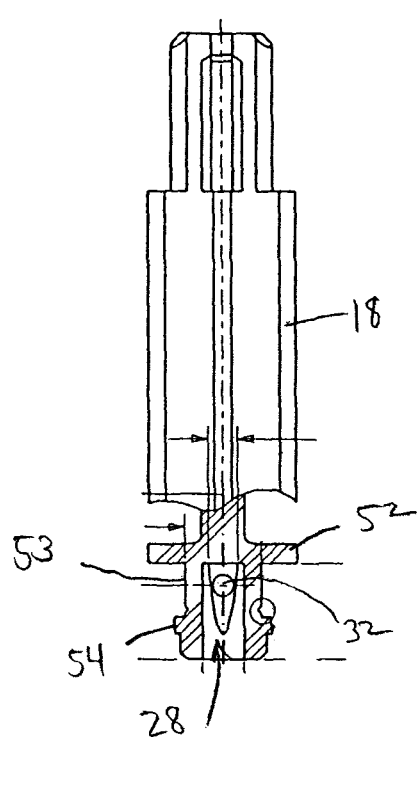
FIG. 6 is a cross-sectional view of a hard core of the plunger of FIG. 5 without a soft exterior portion.
Figure 7:
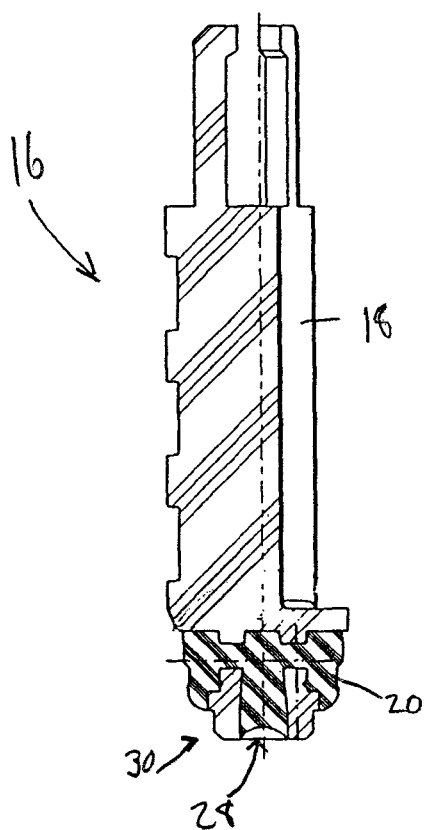
FIG. 7 is a cross-sectional view of the hard core of the plunger of FIG. 5 having the soft exterior portion.
Figure 8:
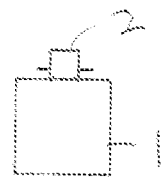
FIG. 8 is a schematic view of a flexible bag and spout.

In one embodiment of the present invention, the hard core 18 of the plunger 16 is molded having holes or apertures 28 (FIGS. 5-7) at the distal end 30 of the hard core 18. When the soft exterior 20 is overmolded to the hard core 18, the soft exterior 20 is shot or molded into the axially extending aperture 28 at the distal end 30 of the hard core 18 to fill the aperture 28 and to flow radially outward through annular openings 32 to form the soft exterior 20 so that the soft exterior 20 is mechanically attached to the hard core 18 of the plunger 16. The distal end 30 of the plunger 18 and the soft exterior 20 is dimensioned to cooperatively engage and form a fluid tight seal with the fluid inlet 22 An example of a hard core 18 having aperture 28 and annular openings 32 at the distal end 30 is illustrated in FIGS. 5-7.

The soft exterior 20 can also be molecularly bonded to the hard core 18 of plunger 16. In this method of the present invention, the hard core 18 is first molded and then the soft exterior 20 is overmolded within a reasonable time subsequent to the molding of the hard core 18. In that way, the soft exterior 20 tends to molecularly bond to the underlying hard core 18 and form a single unit. The present invention also includes embodiments wherein the soft exterior 20 is both molecularly bonded and mechanically attached to the hard core 18.

While the specific embodiments have been illustrated and described, numerous modifications come to mind without significantly departing from the spirit of the invention, and the scope of protection is only limited by the scope of the accompanying Claims.

What is claimed is:

1. A method for dispensing diet soft drink syrup comprising:
providing a fluid tight container of a diet soft drink syrup having a spout for accessing the diet soft drink syrup from a position outside of the container;
providing a fluid flow connector having a plunger that is mounted for movement between an open position to a closed position, the plunger having a rod of a thermoplastic material and a distal end of a thermoplastic elastomer material, the thermoplastic elastomer material having less of a tendency to swell when exposed to the diet soft drink syrup when compared to ethylene propylene diene monomer, the rod has a proximal end and a distal end, the rod having a first annular flange and a second annular flange axially spaced from one another to define an annular channel therebetween, the first annular flange and the second annular flange each extending radially outwardly from the rod and are positioned at the distal end of the rod, the rod having an axially extending aperture through a portion thereof extending from the distal most end of the rod to an intermediate portion thereof, the aperture connected to a radially extending opening positioned within the annular channel, the distal end of the rod is dimensioned to cooperatively engage a fluid inlet to form a fluid tight seal of the inlet; and
docking the fluid flow connector to the spout of the container to place the thermoplastic elastomer material in contact with the diet soft drink syrup and to establish a fluid connection therebetween.

2. The method of claim 1 wherein the thermoplastic elastomer material is overmolded to the rod.

3. The method of claim 1 wherein the plunger is free from O-rings.

4. The method of claim 1 wherein the thermoplastic elastomer is a SANTOPRENE TPV material.

5. The method of claim 1 wherein the thermoplastic material is a polyoxymethylene copolymer.

6. The method of claim 1 wherein the rod has three intersecting ribs extending axially away from the first flange in a direction opposite the second flange to define a generally three-pointed star shaped body when viewed in horizontal cross-sectional dimension.

7. The method of claim 1 further comprising a plurality of fingers at a proximal end of the rod and spaced from one another.

8. The method of claim 7 wherein each of the fingers has an enlarged distal end.

9. The method of claim 8 wherein the enlarged distal end of each of the fingers is generally hook shaped extending radially inwardly of the rod.

10. The method of claim 1 wherein the rod does not extend beyond the fluid inlet when in the open position.

11. A method for dispensing diet soft drink syrup comprising:
providing a fluid tight container of a diet soft drink syrup having a spout for accessing the diet soft drink syrup from a position outside of the container;
providing a fluid flow connector having a housing having a fluid inlet at one end and a fluid outlet at an opposed end and a lumen within the housing connecting the fluid inlet with the fluid outlet;
an adapter having an annular wall concentrically disposed about the fluid flow connector and mounted thereon, the adapter having a set of threads on an inner surface for connecting to the spout, the adapter having a proximal end and a distal end;
a plunger positioned in the lumen and being mounted for movement between an open position to a closed position, the plunger having a proximal end and a distal end, the distal end forms a fluid tight seal with the fluid inlet when in the closed position, the plunger having a core of a thermoplastic material and at a distal end of the plunger having a first annular flange and a second annular flange extending radially outwardly from the core and axially spaced from one another to define an annular channel therebetween, the core having an axially extending aperture through a portion of the core, the aperture connected to a radially extending opening positioned within the annular channel, a thermoplastic elastomer material being positioned in the annular channel, the thermoplastic elastomer material having less of a tendency to swell when exposed to the diet soft drink syrup when compared to ethylene propylene diene monomer; and docking the fluid flow connector to the spout of the container with the adapter to place the thermoplastic elastomer material in contact with the diet soft drink syrup.

12. The method of claim 11 wherein the thermoplastic elastomer material is overmolded to the core.

13. The method of claim 11 wherein the plunger is free from O-rings.

14. The method of claim 11 further comprising a plurality of fingers at the proximal end of the plunger and spaced from one another.

15. The method of claim 14 wherein each of the fingers has an enlarged distal end.

16. The method of claim 15 wherein the enlarged distal end of each of the fingers is generally hook shaped extending radially inwardly of the plunger.

17. The method of claim 11 wherein the core has three intersecting ribs extending axially away from the first flange in a direction opposite the second flange to define a generally three-pointed star shaped body when viewed in horizontal cross-sectional dimension.

18. The method of claim 11 further comprising a spring positioned in the lumen and in cooperative engagement with the proximal end of the plunger and biasing the plunger into the closed position.

* * * * *